US009972080B2

(12) United States Patent
Jung et al.

(10) Patent No.: US 9,972,080 B2
(45) Date of Patent: May 15, 2018

(54) APPARATUS AND METHOD FOR FOOD SEARCH SERVICE

(71) Applicant: ELECTRONICS AND TELECOMMUNICATIONS RESEARCH INSTITUTE, Daejeon (KR)

(72) Inventors: Da Un Jung, Goyang-si (KR); Keun Dong Lee, Daejeon-si (KR); Seung Jae Lee, Daejeon-si (KR); Hyung Kwan Son, Daejeon-si (KR); Weon Geun Oh, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days. days.

(21) Appl. No.: 15/235,152

(22) Filed: Aug. 12, 2016

(65) Prior Publication Data
US 2017/0206646 A1 Jul. 20, 2017

(30) Foreign Application Priority Data

Jan. 14, 2016 (KR) ........................ 10-2016-0004912

(51) Int. Cl.
*G06K 9/00* (2006.01)
*G06T 7/00* (2017.01)
(Continued)

(52) U.S. Cl.
CPC ........ *G06T 7/0004* (2013.01); *G06F 17/3028* (2013.01); *G06F 17/30256* (2013.01);
(Continued)

(58) Field of Classification Search
USPC ....... 382/100, 103, 108, 141, 143, 154, 162, 382/168, 173, 181, 199, 209, 219–225,
(Continued)

(56) References Cited

U.S. PATENT DOCUMENTS 5,454,721 A * 10/1995 Kuch .................. G06F 19/3475
434/127
6,553,386 B1 * 4/2003 Alabaster .............. G06F 19/324
(Continued)

FOREIGN PATENT DOCUMENTS

KR 10-2015-0018759 A 2/2015
KR 10-1523740 B1 5/2015

OTHER PUBLICATIONS

Yuji Matsuda et al., "Recognition of Multiple-Food Images by Detecting Candidate Regions", IEEE ICME, pp. 25-30, 2012.
(Continued)

*Primary Examiner* — Seyed Azarian
(74) *Attorney, Agent, or Firm* — LRK Patent Law Firm

(57) ABSTRACT

An apparatus for food search service includes a food region extractor configured to perform detection in regions in an image where food is present and extract a plurality of candidate regions; a candidate region refiner configured to cluster the candidate regions into groups according to a ratio of overlap between the candidate regions; and a search result generator configured to determine a position of a food region and a food item from the grouped candidate regions.

14 Claims, 17 Drawing Sheets

(51) Int. Cl.
*G06F 17/30* (2006.01)
*G06K 9/46* (2006.01)
*G06K 9/62* (2006.01)
*G09B 19/00* (2006.01)

(52) U.S. Cl.
CPC ..... *G06F 17/30271* (2013.01); *G06K 9/4604* (2013.01); *G06K 9/6218* (2013.01); *G06T 2207/30128* (2013.01)

(58) Field of Classification Search
USPC ........ 382/232, 274–276, 286–297, 305, 312, 382/110, 171; 434/127
See application file for complete search history.

(56) References Cited

U.S. PATENT DOCUMENTS

| 2010/0111383 | A1* | 5/2010 | Boushey | G06K 9/00 382/128 |
| 2010/0173269 | A1* | 7/2010 | Puri | G09B 19/0092 434/127 |
| 2013/0157232 | A1* | 6/2013 | Ehrenkranz | G01G 19/4146 434/127 |
| 2013/0260345 | A1 | 10/2013 | Puri et al. | |

OTHER PUBLICATIONS

Ming-Ming Cheng et al., "BING: Binarized Normed Gradients for Objectness Estimation at 300fps", IEEE Conference on CVPR, pp. 3286-3293, 2014.

* cited by examiner

IN THE CASE OF 1    IN THE CASE OF 0.9    C) IN THE CASE OF 0.5

(a) (b) (c)

APPARATUS AND METHOD FOR FOOD SEARCH SERVICE

CROSS-REFERENCE TO RELATED APPLICATION(S)

This application claims priority to Korean Patent Application No. 10-2016-0004912, filed Jan. 14, 2016, in the Korean Intellectual Property Office, the disclosure of which is incorporated herein by reference in its entirety.

BACKGROUND

1. Field

The following description relates to technology for a food search service, and more particularly, to an apparatus and method for a food search service which can extract and refine candidate regions likely to be recognized as food regions in a food image, and also can locate a position of food in the image.

2. Description of Related Art

Food search services provide users with a diversity of information found about food, such as taste, nutritional data, a restaurant location, a recipe, and the like. Recently, web portal operators have been actively providing information search services related to food by analyzing food images that they have collected in their database. Examples of such food search services include "Im2Calrories" of Google and "View Restaurants (beta)" of Naver, a South Korean Web portal.

An image may portray one dish placed at the center of a table, multiple dishes on the table, or a food tray. Therefore, in order to detect all foods in an image, an art is need that can find the candidate region, and thus extract and classify multiple food regions in a specific area.

In this regard, a method has been suggested which can detect candidate regions using a deformable part model (DPM), a circle detector, and region segmentation, and recognize food items by applying various visual feature extraction methods, including a color histogram and scale invariant feature transform (SIFT), to the candidate regions. However, in this method, boundaries between food regions are not distinguished during the detection of candidate regions, and hence the recognition rate is very low and not many kinds of food can be thus detected.

In addition, in order to detect many kinds of candidate regions, a method has been suggested that normalizes image gradients and extracts multiple object regions by 8×8-binary feature extraction. However, because the object detection suggested by this method is not specialized for the purpose of food recognition, a food region ratio and similarity between object regions are not taken into account, and so it is difficult to achieve reliable search results.

Also, in order to estimate calories of a meal on a food tray, a method has been proposed that recognizes one or more food items of said meal using information about foods' colors and textures. This method includes processes of classification and segmentation of a food image, but does not describe extraction of a candidate region or its position information for identifying a food region.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description relates to an apparatus and method for a food search service, which can distinguish boundaries between food regions and thus recognize many kinds of food items.

The following description also relates to an apparatus and method for a food search service, which performs object detection that focuses on food regions by taking into account a food region ratio and similarity between object regions, and can thus achieve reliable search results.

The following description relates to a method that extracts candidate regions in an image by searching for as many potential food regions, refines and selects the candidate regions, and then searches for a food item.

In one general aspect, there is provided an apparatus for food search service including: a food region extractor configured to perform detection in regions in an image where food is present and extract a plurality of candidate regions; a candidate region refiner configured to cluster the candidate regions into groups according to a ratio of overlap between the candidate regions; and a search result generator configured to determine a position of a food region and a food item from the grouped candidate regions.

In another general aspect, there is provided a method for food search service including: performing detection in regions in an image where food is present and extracting a plurality of candidate regions; clustering the candidate regions into groups according to a ratio of overlap between the candidate regions; and determining a position of a food region and a food item from the grouped candidate regions.

Other features and aspects will be apparent from the following detailed description, the drawings, and the claims.

Figure 1:
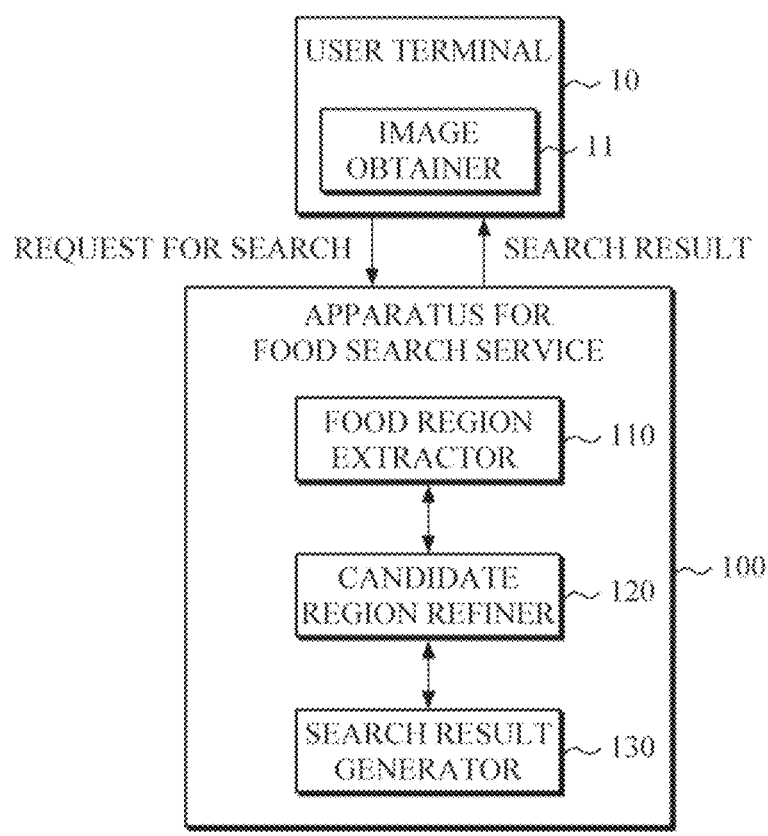
FIG. 1 is a diagram illustrating a system that includes an apparatus for a food search service according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, embodiments of the invention will be described in detail with reference to the accompanying drawings. Terms used herein are selected by considering functions in the embodiment and meanings may vary depending on, for example, a user or operator's intentions or customs. Therefore, in the following embodiments, when terms are specifically defined, the meanings of terms should be interpreted based on those definitions, and otherwise, should be interpreted based on general meanings recognized by those skilled in the art. In this specification, a case in which a first material layer is formed on a second material layer may be interpreted to have both a case in which the first material layer is directly formed on the second material layer and a case in which a third material layer (an upper material layer) is interposed between the first material layer and the second material layer when there is no description explicitly excluded.

FIG. 1 is a diagram illustrating a system that includes an apparatus for a food search service according to an exemplary embodiment of the present invention.

Referring to FIG. 1, the apparatus 100 for a food search service (hereinafter, will be referred to as an "apparatus") searches for any food items contained in an image transmitted from a user terminal 10, and provides the user terminal with information about a region of an image in which food is found.

Here, it is construed that the user terminal 10 is any device including mobile communication terminals, such as personal digital assistants, smartphones, and navigation terminals, as well as personal computers, such as desktop computers, and laptop computers, which can transmit a food image to the apparatus 100 to request for search for food from the image.

The user terminal 10 may include an image obtainer to obtain a food image for search, according to an exemplary embodiment. Here, the image obtainer 11 may detect an existing food image from memory (not shown), receive a food image via a communication part (not shown), or obtain a real-time food image. In addition, the user terminal 10 may transmit the food image for search to the apparatus 100 through the communication part, and receive, in turn, a search result from the apparatus 100.

The apparatus 100 includes a food region extractor 110, a candidate region refiner 120, and a search result generator 130.

The food region extractor 110 performs a learning-based detection in regions in an image where food is present and then extracts a plurality of candidate regions. In this case, the region in which food is present is marked by a minimum bounding box that surrounds one food item; the candidate regions refer to regions in which a number of possible objects that are likely to be recognized as food items. The food region extractor 110 will be described in detail with reference to FIGS. 2 and 3.

The candidate region refiner 120 groups together the candidate regions according to a ratio of overlap between the candidate regions extracted by the food region extractor 110. The candidate region refiner 120 will be described later in detail with reference to FIGS. 4 to 10C.

The search result generator 130 determines a final food region and the kind of food from the candidate regions refined by the candidate region refiner 120. The search result generator 130 will be described later in detail with reference to FIGS. 11 and 12.

Figure 2:
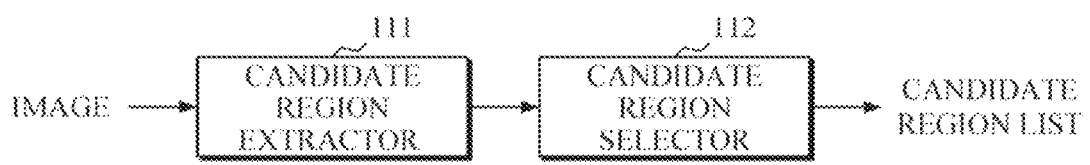
FIG. 2 is a diagram illustrating the food region extractor shown in FIG. 1.

FIG. 2 is a diagram illustrating the food region extractor shown in FIG. 1.

Referring to FIG. 2, the food region extractor 110 includes a candidate region extractor 111 and a candidate region selector 112.

The candidate region extractor 111 detects a number of regions of the input image in each of which an item likely to be food is present. A food region is determined by a minimum unit of food recognition, and the food region contains location information about the food item in the image. The candidate region extractor 111 resizes food regions of the input image into different sizes of food regions based on values that are multiples of the minimum unit of food recognition, and extracts all food regions based on a learning model of 64-dimensional feature vectors. Said learning model of 64-dimensional feature vectors is built by training through 8×8 sliding windows.

The candidate region selector 112 selects a plurality of detected regions according to specific criteria to decide on a final list of candidate regions. According to one exemplary embodiment, a region whose aspect ratio between a minor axis and a major axis is not 1:2 is excluded from the candidate regions. This is because a food image is generally taken from an elevated angle. In addition, if the detected region is too small to be recognized, it is ruled out from the candidate regions.

Figure 3:
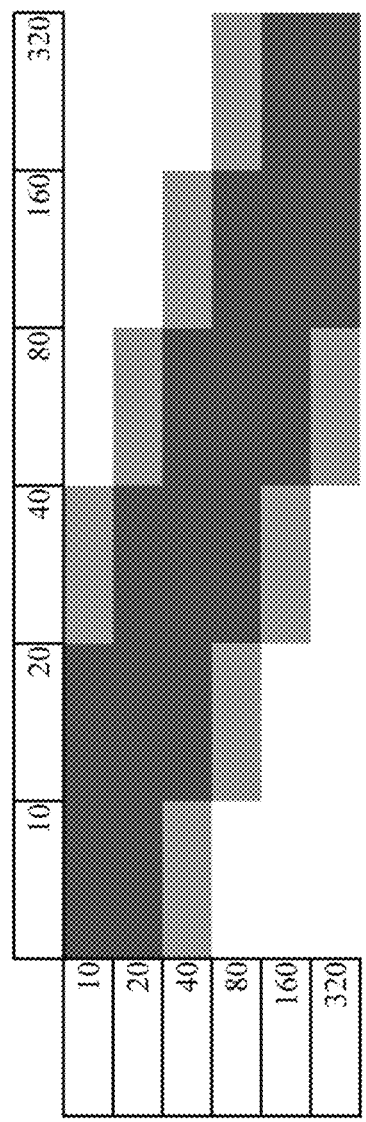
FIG. 3 is a diagram illustrating examples of an image size selected as a candidate region.

FIG. 3 is a diagram illustrating examples of an image size selected as a candidate region.

Referring to FIG. 3, a search range covers a 320×320 image area, whereby the minimum area is 10×10. In FIG. 3, a darker area indicates a candidate region, and a lighter area indicates a non-candidate region.

Figure 4:
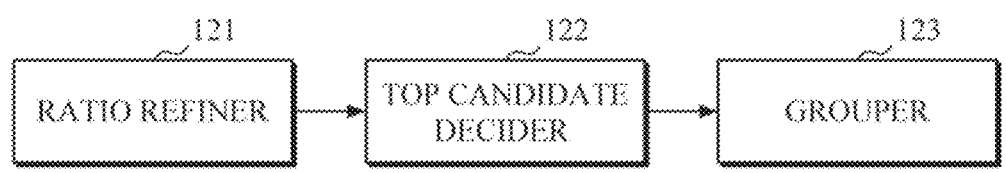
FIG. 4 is a diagram illustrating a candidate region refiner shown in FIG. 1.

FIG. 4 is a diagram illustrating a candidate region refiner shown in FIG. 1.

Referring to FIG. 4, the candidate region refiner 120 includes a ratio refiner 121, a top candidate decider 122, and a grouper 123.

With respect to each candidate region of the candidate region list, the ratio refiner 121 uses the value of an overlapping area between two candidate regions (hereinafter referred to as 'overlap value'), to which said value is compared to the area value of the smaller region of the two. A ratio of said overlap value to the area value of the smaller region (hereinafter referred to simply as 'ratio') is calculated, whereby if the ratio is greater than or equal to 1, said larger region is removed from the candidate region list.

Figure 5:
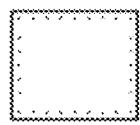
FIG. 5 is a diagram illustrating examples of an overlapping area between candidate regions.
Figure 5:
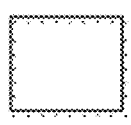
Figure 5:
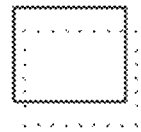

FIG. 5 is a diagram illustrating examples of an overlapping area between candidate regions.

Referring to FIG. 5(a), a ratio that is greater than or equal to 1 indicates that a certain region is belongs entirely within a larger region. Hence the larger region is ruled out from the list of candidate regions. Referring to FIG. 5(b), an overlap value of two regions and the value of the smaller region of the two is used to measure the ratio, which is 0.9, while in FIG. 5(c), it can be seen that a ratio is 0.5.

Figure 6:
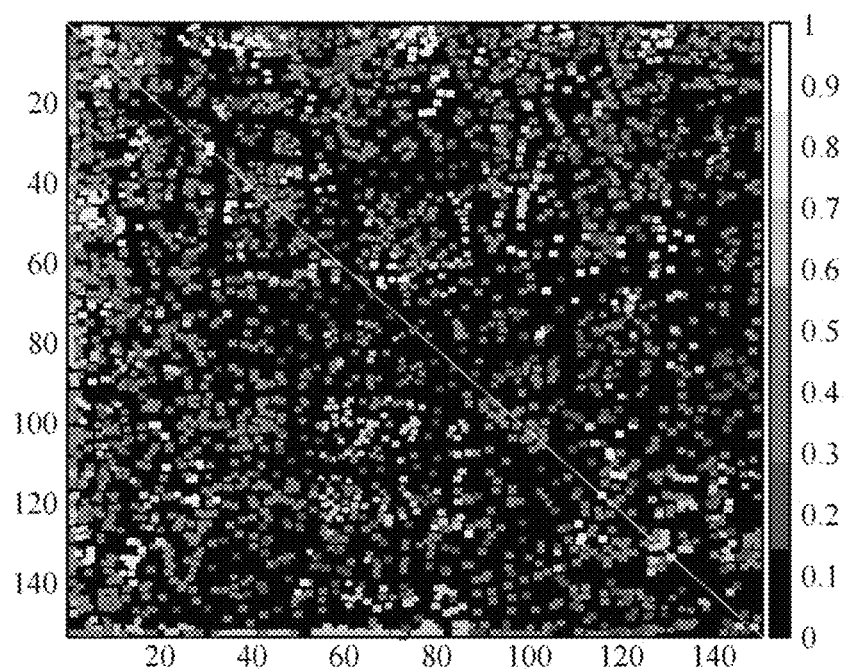
FIG. 6 is an example of a graph of a ratio of overlap between candidate regions.

FIG. 6 is an example of a graph of a ratio of overlap between candidate regions.

Referring to FIG. 6, the horizontal axis and the vertical axis represent indices of the candidate regions in a graph. When a ratio is greater than or equal to 1, it is marked in the graph with a brighter color; if a ratio is smaller than 1, it is marked with a darker color. A diagonal line represents the ratios of each candidate region and itself, and it therefore 1.

Figure 7A:
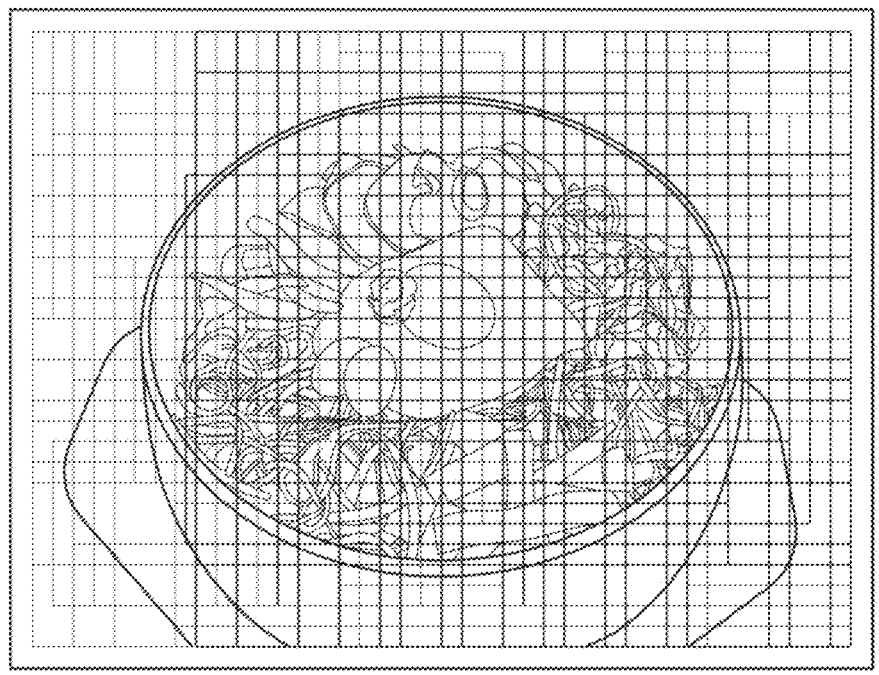
FIG. 7A shows an example of a food image on which all candidate regions are displayed.
Figure 7B:
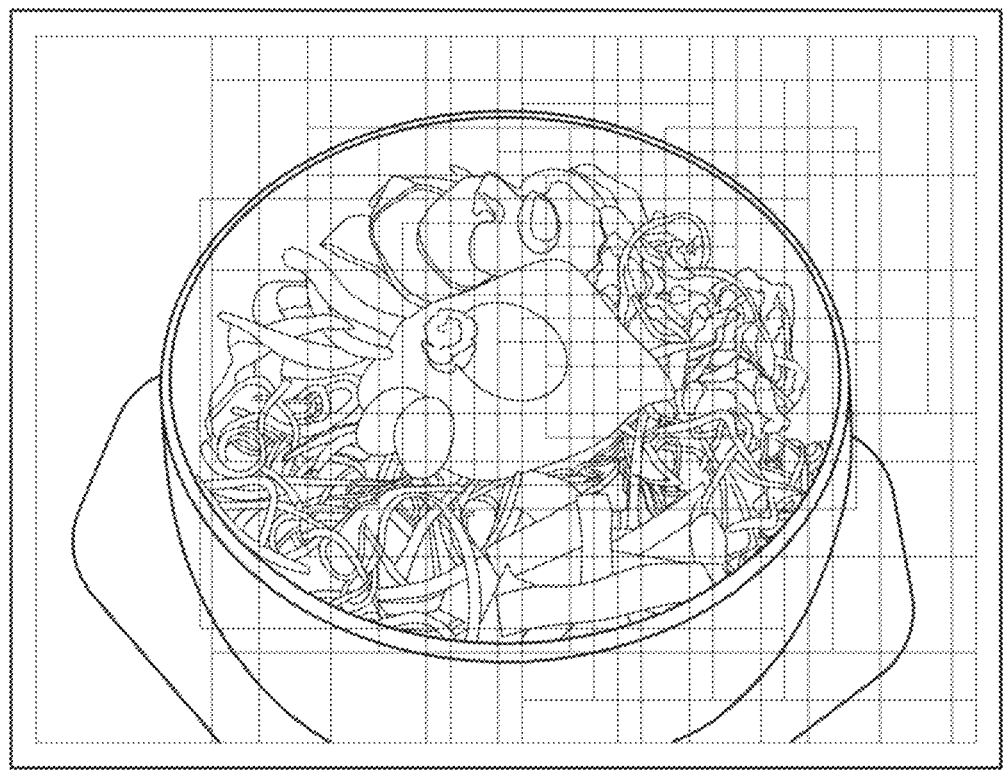
FIG. 7B shows an example of the food image of FIG. 7A from which candidate regions with a ratio greater than or equal to 1 have been removed.

FIG. 7A shows an example of a food image on which all candidate regions are displayed, and FIG. 7B shows an example of the food image of FIG. 7A from which candidate regions with a ratio greater than or equal to 1 have been removed. Referring to FIGS. 7A and 7B, it can be seen that overlapping areas of candidate regions are reduced by the ratio refiner 121.

The top candidate decider 122 calculates the mean of the ratios of overlap values calculated by the ratio refiner 121 and selects a designated number of top candidate regions.

The grouper 123 divides the selected candidate regions into groups according to a threshold associated with each ratio. That is, candidate regions with similar ratios are grouped together to reduce the number of candidate regions. At this time, clustering schemes, such as k-means clustering, may be used.

Figure 8A:
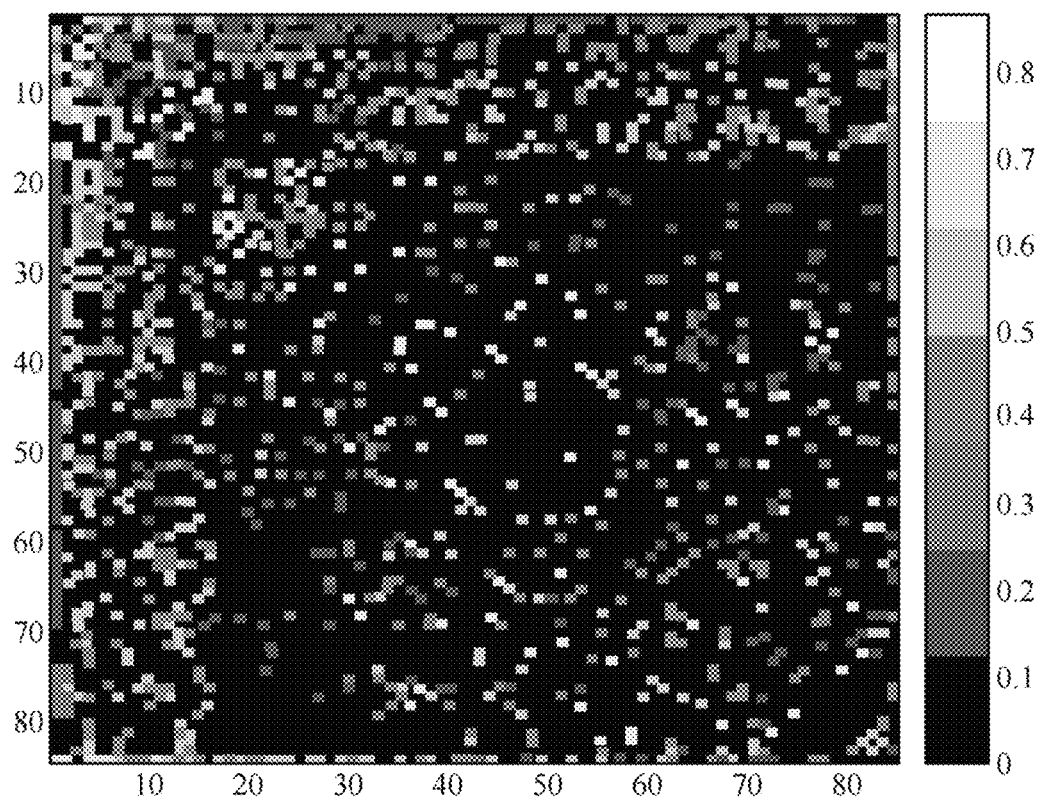
FIGS. 8A and 8B are graphs showing an example of grouping of the same candidate regions.
Figure 8B:
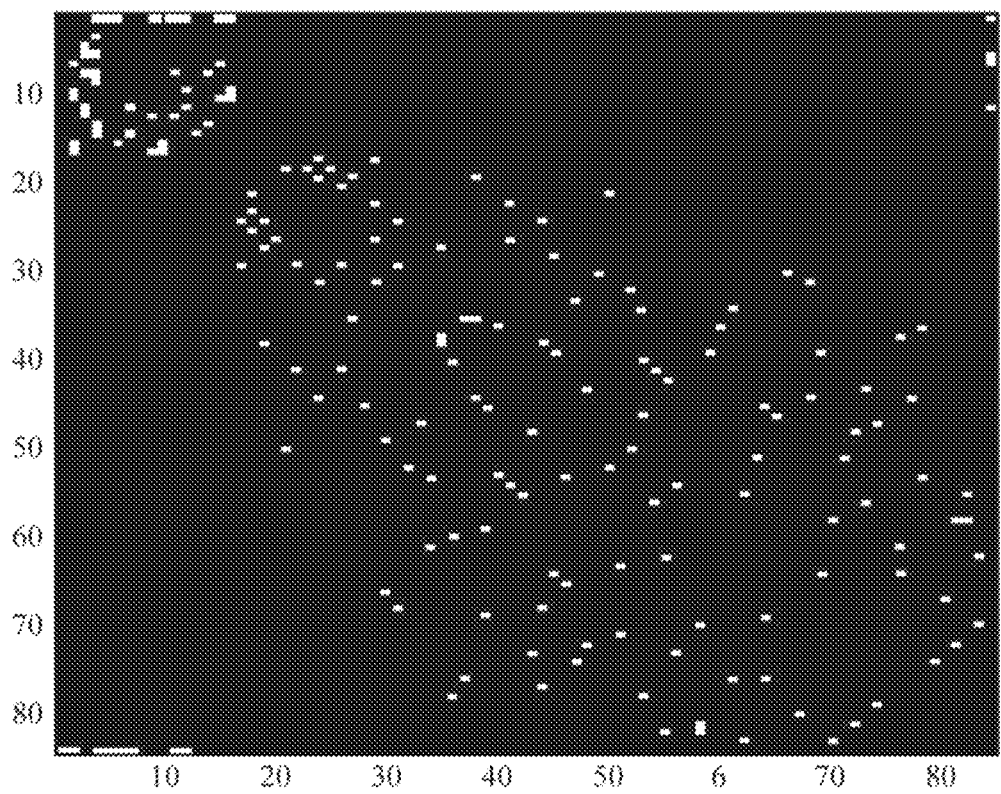

FIGS. 8A and 8B are graphs showing an example of grouping of the same candidate regions.

Referring to FIG. 8A, if a ratio is greater than or equal to 1, it indicates that a region of interest belongs entirely within a candidate region, and hence only the larger candidate region can be seen. Therefore, candidate regions with a ratio greater than or equal to 1 are ruled out.

Referring to FIG. 8B, the mean of the ratios of all candidate regions is calculated, then only N-number of top candidate regions are selected, and the selected N-number of candidate regions are clustered into groups using, for example, k-means clustering, according to a threshold associated with each ratio.

Figure 9:
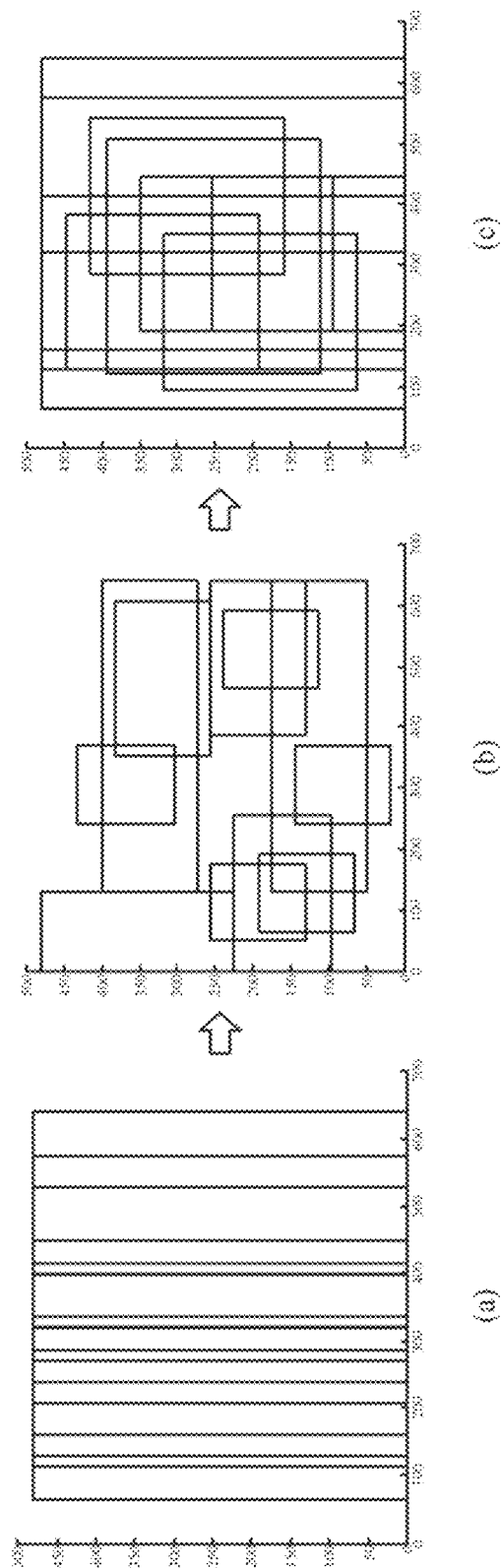
FIG. 9 shows graphs to show an example of results of grouping top 10 candidate regions in the case where dish is located at the center of an image.

FIG. 9 shows graphs to show an example of results of grouping top 10 candidate regions in the case where dish is located at the center of an image.

Referring to FIG. 9, the mean of the ratios of all candidate regions is calculated, whereby the greater the mean, the greater the probability of overlap between candidate regions, which in turn allows one to assume that there is a higher probability of locating food in a pertinent region. After calculating the mean ratio of all candidate regions, N number of top candidate regions are arranged in the order of highest to lowest. Final candidate regions are determined after adjusting the ratio of the selected N number of candidate regions. It can be seen in FIG. 9 that candidate regions are mostly extracted from the center of the image.

Figure 10A:
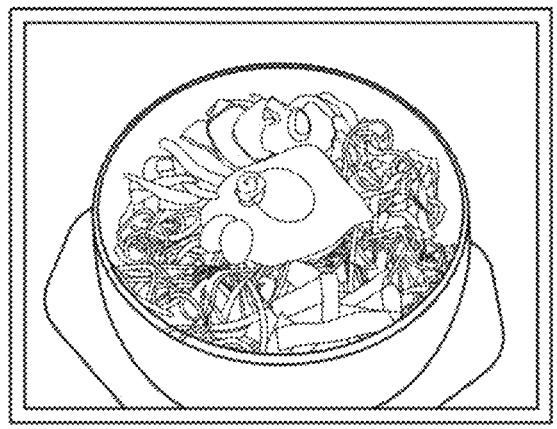
FIG. 10A shows an example of a food image.
Figure 10B:
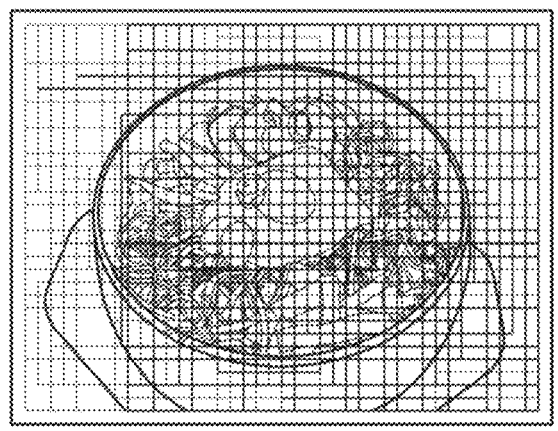
FIG. 10B shows the food image of FIG. 10A on which extracted candidate regions are displayed, and, FIG. 10C shows the food image after the candidate regions shown in FIG. 10B have been refined.
Figure 10C:
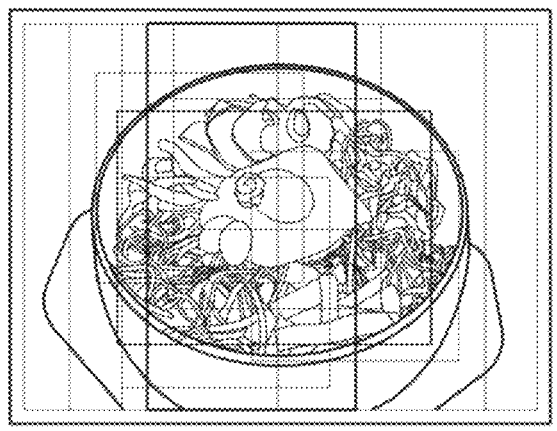

FIG. 10A shows an example of a food image, FIG. 10B shows the food image of FIG. 10A on which extracted candidate regions are displayed, and FIG. 10C shows the food image after the candidate regions shown in FIG. 10B have been refined. Referring to FIGS. 10A to 10C, it can be seen that a result of the extracted candidate regions is improved through a process of candidate region refining.

Figure 11:
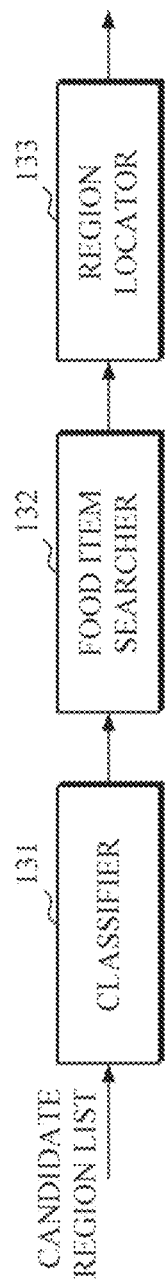
FIG. 11 is a diagram illustrating a result generator of FIG. 1.

FIG. 11 is a diagram illustrating a result generator of FIG. 1.

Referring to FIG. 11, the search result generator 130 includes a classifier 131, a food item searcher 132, and a region locator 133.

The classifier 131 calculates accuracy of the refined candidate regions based on the convolutional neural network (CN) trained with deep learning, and then said classifier 131 arranges the candidate regions in the descending order from higher to lower score.

The food item searcher 132 finds a food item with the highest score to be the appropriate item for the candidate regions.

The region locator 133 completes a bounding box that is formed by the outermost edges of the overlap between the candidate region of the highest probability and the candidate regions belonging to the same group.

Figure 12:
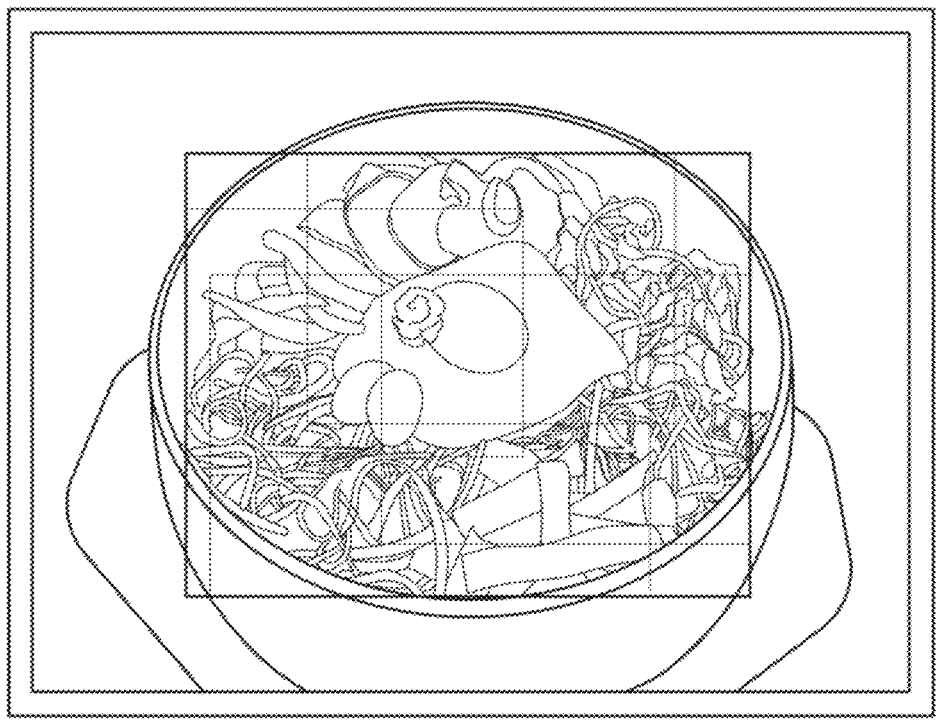
FIG. 12 shows an example of the result of detecting the candidate regions of a food image according to the present disclosure.

FIG. 12 shows an example of the result of detecting the candidate regions of a food image according to the present disclosure.

Referring to FIG. 12, it can be seen that grouped candidate regions and the outermost edge bounding box of the regions are calculated and the calculation results are displayed on the food image.

Figure 13:
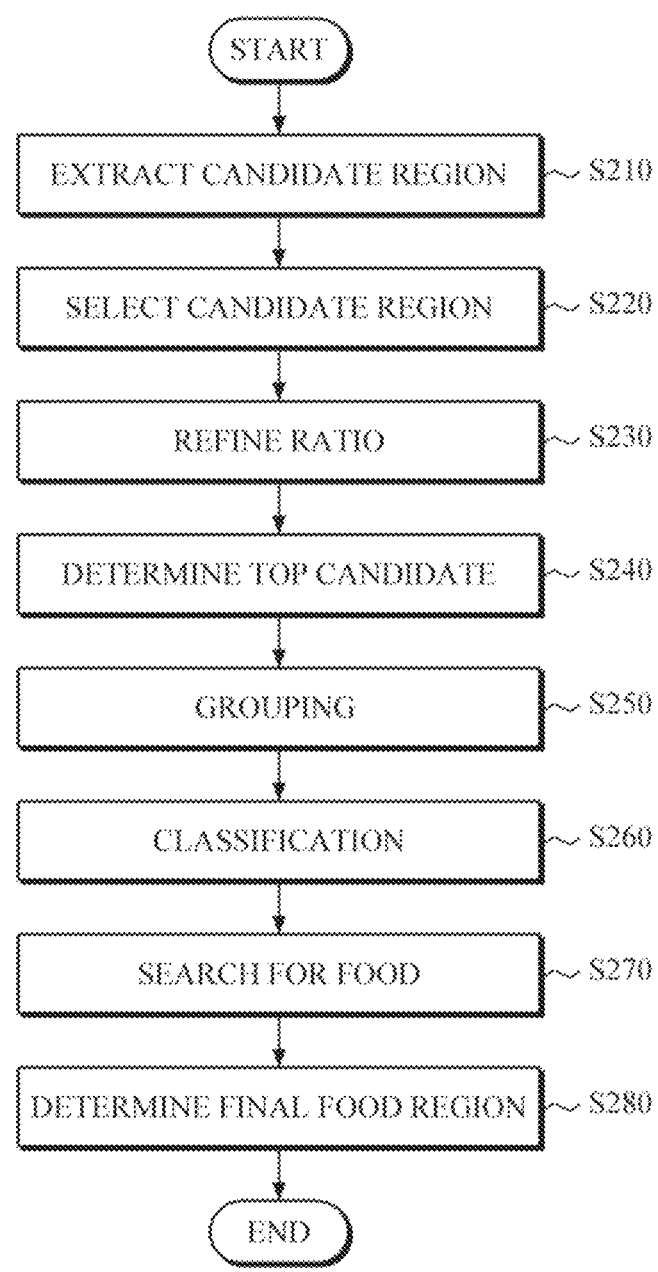
FIG. 13 is a flowchart illustrating a method for a food search service according to an exemplary embodiment.

FIG. 13 is a flowchart illustrating a method for a food search service according to an exemplary embodiment.

Referring to FIG. 13 in conjunction with FIG. 1, the method for a food search service includes performing a learning-based detection in regions in an image where food is present and then extracts a plurality of candidate regions, wherein the food image is one which has been transmitted from the user terminal 10, as depicted in S210 and S220. Also, the method further includes grouping the candidate regions according to ratios of overlap between extracted candidate regions, as depicted in S230 to S250, and a final decision of a food region and a food item from within refined candidate regions, as depicted in S260 to S280. In this case, the region in which food is present is marked by a minimum bounding box that surrounds one food item; the candidate regions indicate regions in which a number of possible objects are likely to be recognized as food items.

In the extraction of candidate regions, as depicted in S210 and S220, the apparatus 100 may detect a plurality of regions from the input image that contain objects that are likely to be recognized as food, as depicted in S210. In more detail, food regions of the input image are resized into different sizes of food regions based on values that are multiples of the minimum unit of food recognition, and all food regions are extracted based on a learning model of 64-dimensional feature vectors, which is built by training through 8×8 sliding windows.

Then, the apparatus 100 selects a plurality of detected regions according to specific criteria to determine a final list of candidate regions, as depicted in S220. According to the exemplary embodiment, a region whose aspect ratio between a minor axis and a major axis is not 1:2 is excluded from the candidate regions. This is because a food image is generally taken from elevated angle. In addition, if the detected region is too small to be recognized, it is ruled out from the candidate regions.

In the grouping of the candidate regions, as depicted in S230 to S250, the apparatus 100 uses the value of an overlapping area between two candidate regions (hereinafter referred to as 'overlap value'), to which said value is compared to the area value of the smaller region of the two in the candidate region list. A ratio of said overlap value to the area value of the smaller region (hereinafter referred to simply as 'ratio') is calculated, whereby if the ratio is greater than or equal to 1, said larger region is removed from the candidate region list, as depicted in S230.

Thereafter, the apparatus 100 calculates a mean of the calculated ratios of overlap values, and selects a designated number of top candidate regions, as depicted in S240.

Then, the apparatus 100 clusters the selected top candidate regions into groups based on a threshold associated with each ratio, as depicted in S250. Accordingly, the candidate regions with similar ratios are grouped together, so that the number of candidate regions is reduced. In this case, clustering schemes, such k-means clustering, may be used.

In the determination of the food item and the food region, as depicted in S260 to S280, the apparatus 100 calculates accuracy of the refined candidate regions based on the convolutional neural network (CNN) trained with deep learning, and then arranges the candidate regions in the descending order from higher to lower score, as depicted in S260. Then, the apparatus 100 finds a food item with the highest score to be the appropriate item for the candidate regions. The apparatus 100 completes a bounding box that is formed by the outermost edges of the overlap between the candidate region of the highest probability and the candidate regions belonging to the same group.

According to the exemplary embodiments as described above, it is possible to refine all candidate regions that are possible to be recognized as food items, based on a probability model, as well as to select regions that can result in higher search efficiency. Therefore, the apparatus and method described in the present disclosure may allow for simultaneous search of multiple food items from a particular region, such as a food tray, as well as automatically distinguish between food items and food regions, thereby providing not only nutritional information of daily meals, but also assistance in organizing menus for patients who require dietary restrictions.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for food search service, comprising:
a processor; and
one or more units comprising executable code configured and executed by the processor using algorithm associated with a non-transitory storage device,
wherein the one or more units comprise:
a food region using the processor to detect regions in an image where food is present and extract a plurality of candidate regions;
a candidate region using the processor to cluster the candidate regions into groups according to a ratio of overlap between the candidate regions; and
a search result using the processor to determine a position of a food region and a food item from the grouped candidate regions based on convolutional neural network trained with deep learning.

2. The apparatus of claim 1, wherein the food region using the processor:
resizes food regions of the input image into different sizes of food regions based on values that are multiples of the minimum unit of food recognition, and
extracts all food regions based on a learning model of feature vectors, which is built by training through sliding windows of a specific size.

3. The apparatus of claim 1, wherein the food region using the processor selects candidate regions that satisfy a designated size criterion.

4. The apparatus of claim 3, wherein the food region using the processor rules out, from the candidate regions, a region whose aspect ratio between a minor axis and a major axis is not a specific value, or a region with a size smaller than a specific size.

5. The apparatus of claim 1, wherein the candidate region using the processor comprises:
a top candidate decider using the processor to calculate a mean of ratios of overlap values and select a designated number of top candidate regions, and
a grouper using the processor to cluster the selected candidate regions into groups according to a threshold associated with each ratio.

6. The apparatus of claim 1, wherein the candidate region using the processor:
measures a ratio of an overlapping area between the two candidate regions to an area of a smaller region of the two candidate regions, and
if the ratio is greater than or equal to 1, removes a larger region of the two candidate regions from the candidate regions.

7. The apparatus of claim 1, wherein the search result using the processor:
calculates a probability of each of possible food items in the extracted candidate regions using a designated learning model,
arranges the food items sequentially according to the calculated probabilities, and
determines a food item of the highest probability for the candidate regions.

8. A method for food search service, the method being implemented by a processor executing instructions stored in a non-transitory computer-readable medium and comprising:
detecting, by a food region using the processor, regions in an image where food is present and extracting a plurality of candidate regions;
clustering, by a candidate region using the processor, the candidate regions into groups according to a ratio of overlap between the candidate regions; and
determining, by a search result using the processor, a position of a food region and a food item from the grouped candidate regions based on convolutional neural network trained with deep learning.

9. The method of claim 8, wherein the extracting of the candidate regions comprises:
resizing food regions of the input image into different sizes of food regions based on values that are multiples of the minimum unit of food recognition, and
extracting all food regions based on a learning model of feature vectors, which is built by training through sliding windows of a specific size.

10. The method of claim 8, wherein the extracting of the candidate regions comprises selecting candidate regions that satisfy a designated size criterion.

11. The method of claim 10, wherein the selecting of the candidate regions comprises ruling out, from the candidate regions, a region whose aspect ratio between a minor axis and a major axis is not a specific value, or a region with a size smaller than a specific size.

12. The method of claim 8, wherein the clustering of the candidate regions comprises:
calculating a mean of ratios of overlap values to select a designated number of top candidate regions, and
clustering the selected candidate regions into groups according to a threshold, associated with each ratio.

13. The method of claim 8, wherein the clustering of the candidate regions comprises:

measuring, a ratio of an overlapping area between the two candidate regions to an area of a smaller region of the two candidate regions, and if the ratio is greater than or equal to 1, remove a larger region of the two candidate regions from the candidate regions.

14. The method of claim 8, wherein the determining of the position of a food region, and the food item comprises:

calculating a probability of each of possible food items in the extracted candidate regions using a designated learning model, arranging the food items sequentially according to the calculated probabilities, and determining a food item of the highest probability for the candidate regions.

* * * * *